(12) United States Patent
Keane et al.

(10) Patent No.: US 9,329,682 B2
(45) Date of Patent: May 3, 2016

(54) MULTI-STEP VIRTUAL OBJECT SELECTION

(71) Applicant: Microsoft Technology Licensing, LLC, Redmond, WA (US)

(72) Inventors: Brian E. Keane, Bellevue, WA (US); Ben J. Sugden, Woodinville, WA (US); Robert L. Crocco, Jr., Seattle, WA (US); Daniel Deptford, Redmond, WA (US); Tom G. Salter, Seattle, WA (US); Laura K. Massey, Redmond, WA (US); Alex Aben-Athar Kipman, Redmond, WA (US); Peter Tobias Kinnebrew, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/921,109

(22) Filed: Jun. 18, 2013

(65) Prior Publication Data

US 2014/0372957 A1 Dec. 18, 2014

(51) Int. Cl.
| | |
|---|---|
| G06F 9/45 | (2006.01) |
| G06F 3/01 | (2006.01) |
| G06F 3/0484 | (2013.01) |
| G06F 3/0481 | (2013.01) |
| G06F 3/0482 | (2013.01) |
| G02B 27/01 | (2006.01) |

(52) U.S. Cl.
CPC .............. *G06F 3/013* (2013.01); *G02B 27/017* (2013.01); *G06F 3/011* (2013.01); *G06F 3/012* (2013.01); *G06F 3/0482* (2013.01); *G06F 3/04815* (2013.01); *G06F 3/04842* (2013.01); *G02B 2027/0178* (2013.01)

(58) Field of Classification Search
CPC . G06F 3/013; G06F 3/04842; G06F 3/04815; G06F 3/012
USPC .......................................................... 717/140
See application file for complete search history.

(56) References Cited

U.S. PATENT DOCUMENTS

| | | | |
|---|---|---|---|
| 4,595,990 A | 6/1986 | Garwin et al. | |
| 7,401,920 B1 * | 7/2008 | Kranz et al. | 351/210 |
| 2011/0019874 A1 | 1/2011 | Järvenpää et al. | |

(Continued)

FOREIGN PATENT DOCUMENTS

EP 1422923 A2 5/2004

OTHER PUBLICATIONS

International Search Report & Written Opinion dated Aug. 28, 2014, in PCT Patent Application No. PCT/US2014/041961, filed Jun. 11, 2014.

(Continued)

*Primary Examiner* — Anna Deng
(74) *Attorney, Agent, or Firm* — Dan Choi; Judy Yee; Micky Minhas

(57) ABSTRACT

A head mounted display allows user selection of a virtual object through multi-step focusing by the user. Focus on the selectable object is determined and then a validation object is displayed. When user focus moves to the validation object, a timeout determines that a selection of the validation object, and thus the selectable object has occurred. The technology can be used in see through head mounted displays to allow a user to effectively navigate an environment with a multitude of virtual objects without unintended selections.

20 Claims, 15 Drawing Sheets

(56) References Cited

U.S. PATENT DOCUMENTS

| | | | |
|---|---|---|---|
| 2012/0005624 | A1 | 1/2012 | Vesely |
| 2012/0019662 | A1 | 1/2012 | Maltz |
| 2012/0086645 | A1 | 4/2012 | Zheng et al. |
| 2013/0024047 | A1 | 1/2013 | Kalhous et al. |
| 2013/0038510 | A1 | 2/2013 | Brin et al. |
| 2013/0044042 | A1 | 2/2013 | Olsson et al. |
| 2013/0050432 | A1* | 2/2013 | Perez et al. ............ 348/47 |
| 2013/0314303 | A1* | 11/2013 | Osterhout et al. .......... 345/8 |
| 2013/0321462 | A1* | 12/2013 | Salter et al. ............ 345/633 |
| 2013/0326364 | A1* | 12/2013 | Latta et al. ............ 715/751 |
| 2013/0335301 | A1* | 12/2013 | Wong et al. .............. 345/8 |
| 2013/0335405 | A1* | 12/2013 | Scavezze et al. ....... 345/419 |
| 2014/0049462 | A1* | 2/2014 | Weinberger et al. ..... 345/156 |
| 2014/0125698 | A1* | 5/2014 | Latta et al. ............ 345/633 |

OTHER PUBLICATIONS

Response to International Search Report & Written Opinion filed Nov. 20, 2014, in PCT Patent Application No. PCT/US2014/041961.

Stiefelhagen, et al., "Head Orientation and Gaze Direction in Meetings", in Proceedings of CHI '02 Extended Abstracts on Human Factors in Computing Systems, Apr. 20, 2002, 2 pages.

Ba, et al., "Recognizing Visual Focus of Attention from Head Pose in Natural Meetings", in Proceedings of IEEE Transactions on Systems, Man, and Cybernetics, Part B: Cybernetics, Feb. 2009, 18 pages.

Voit, et al., "Tracking Head Pose and Focus of Attention with Multiple Far-Field Cameras", in Proceedings of 8th International Conference on Multimodal Interfaces, Nov. 2, 2006, 6 pages.

Laqua, et al., "GazeSpace—Eye Gaze Controlled Content Spaces", in Proceedings of 21st British HCI Group Annual Conference on People and Computers, Sep. 3, 2007, 4 pages.

Stellmach, et al., "Designing Gaze-Based User Interfaces for Steering in Virtual Environments", in Proceedings of Symposium on Eye Tracking Research and Applications, Mar. 28, 2012, 8 pages.

"Xbox Zune VoD (Video on Demand) innovative gesture navigation with Kinect", YouTube video, Uploaded by Kanal von Leeyueece (leeyueece) , Published on Jun. 3, 2011. http://www.youtube.com/watch?v=zIEOtdfKNnA.

"PlayStation Move Setup", YouTube video, Uploaded by ashjimmymilo on Sep. 20, 2010. http://www.youtube.com/watch?v=dNp4zIJcPrU.

"How to access menus with the Hotbox|lynda.com tutorial", YouTube video, Uploaded by lynda.com on Jun. 3, 2010. http://www.youtube.com/watch?v=zeYyKkOOxIo.

"Office 2013 in Tablet PC and Preview on a Windows 8 Release—Fist Look", Uploaded by sandracvm, Published on Jul. 24, 2012. http://www.youtube.com/watch?v=SCEGZ2ijSCY.

"International Preliminary Report on Patentability Issued in PCT Patent Application No. PCT/US2014/041961", Mailed Date: Aug. 18, 2015, 9 Pages (MS# 337632.02 ).

* cited by examiner

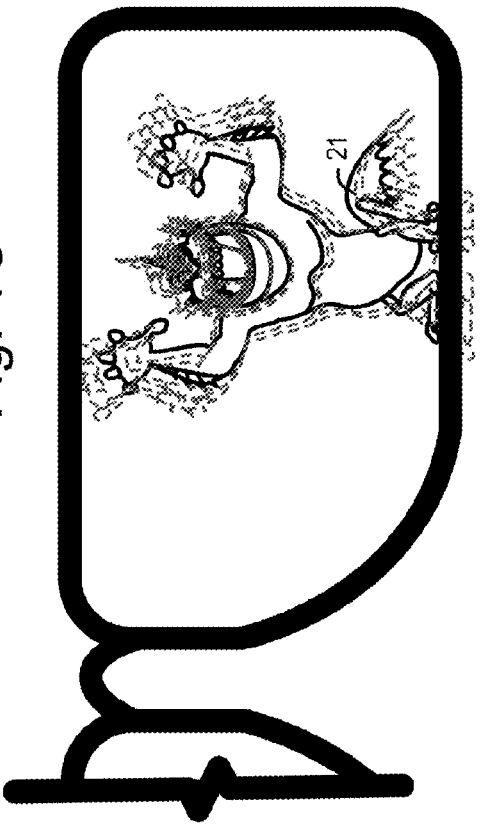
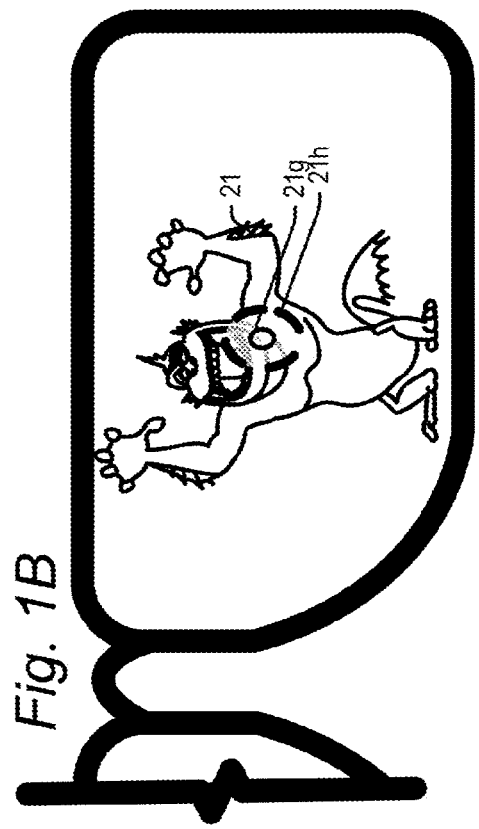

(Step 810)

(Step 814)

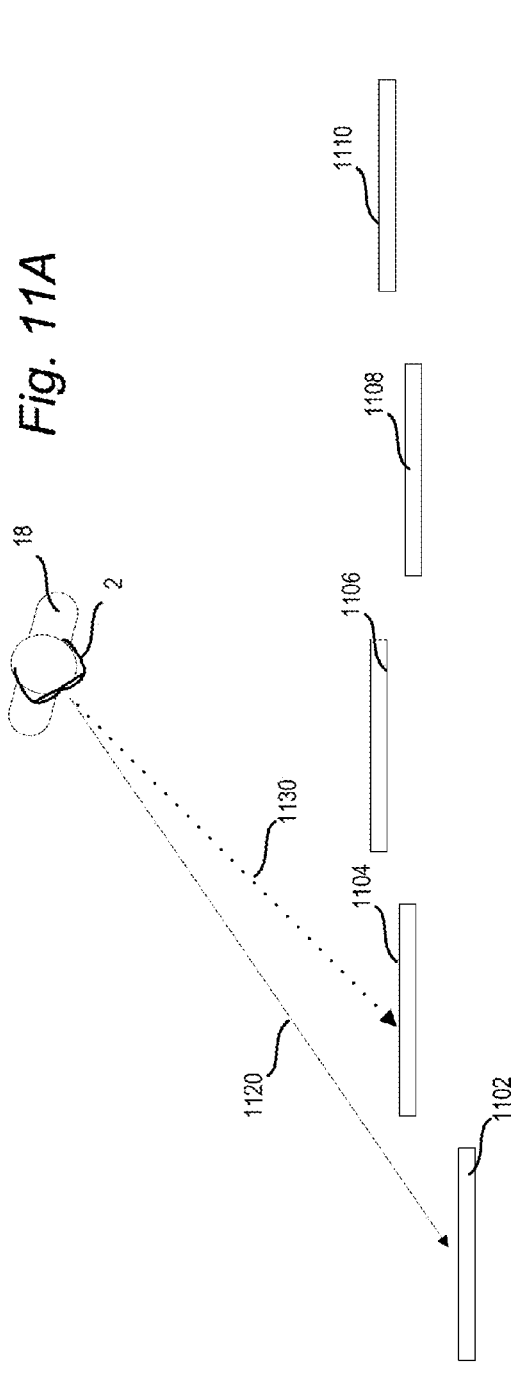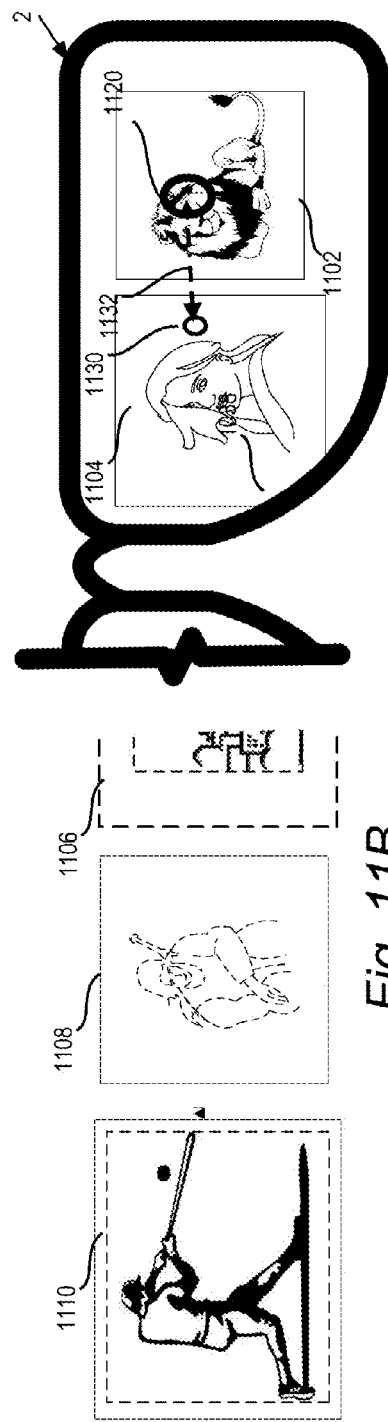

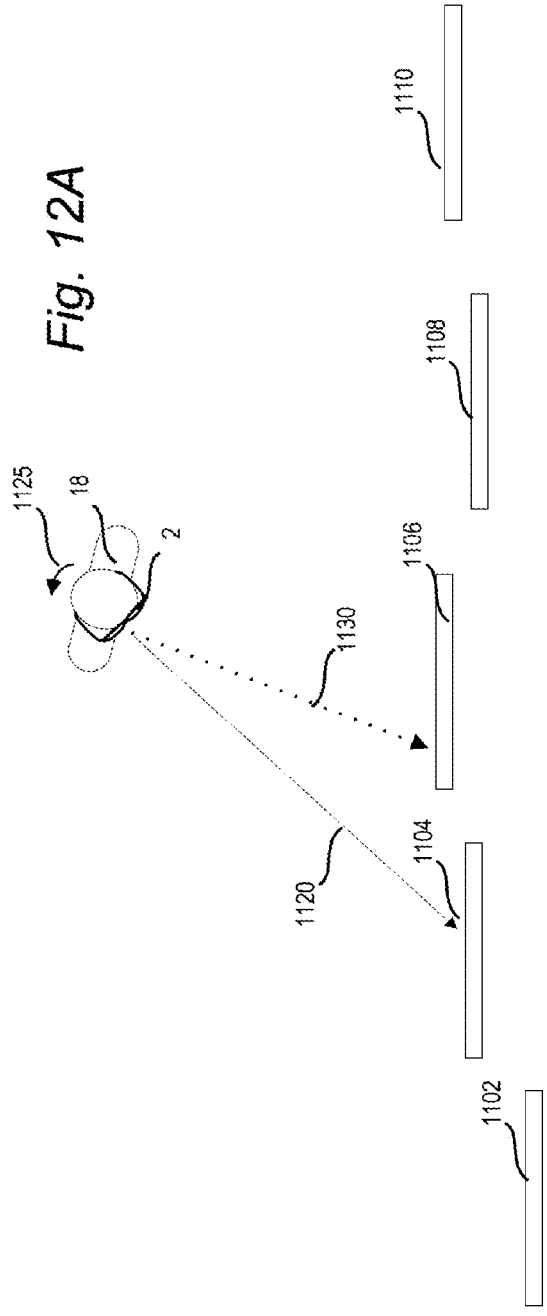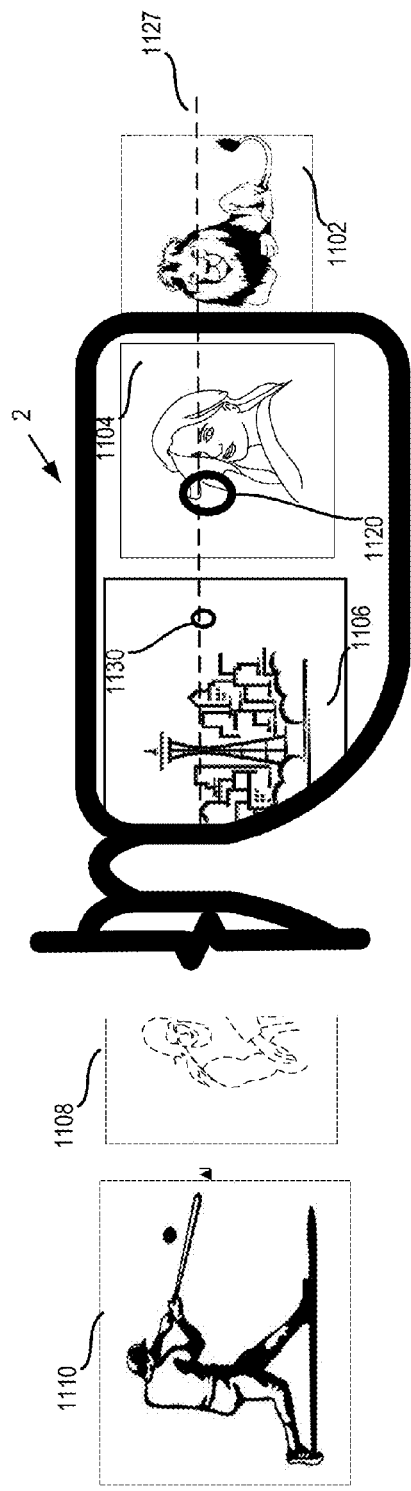

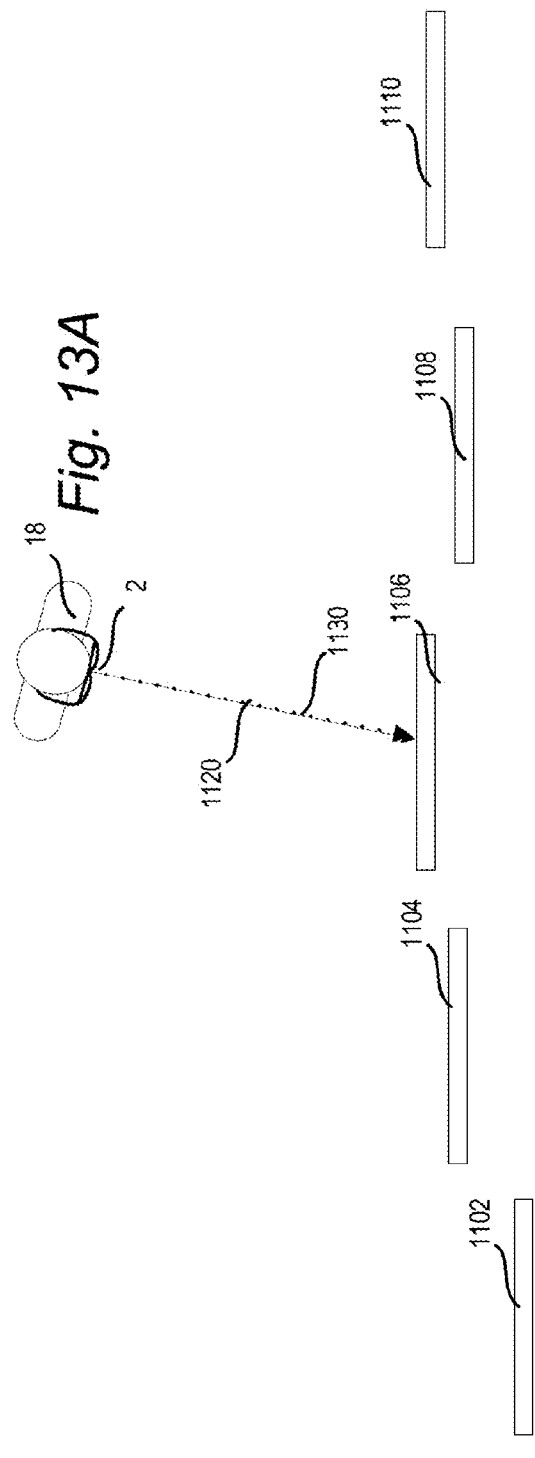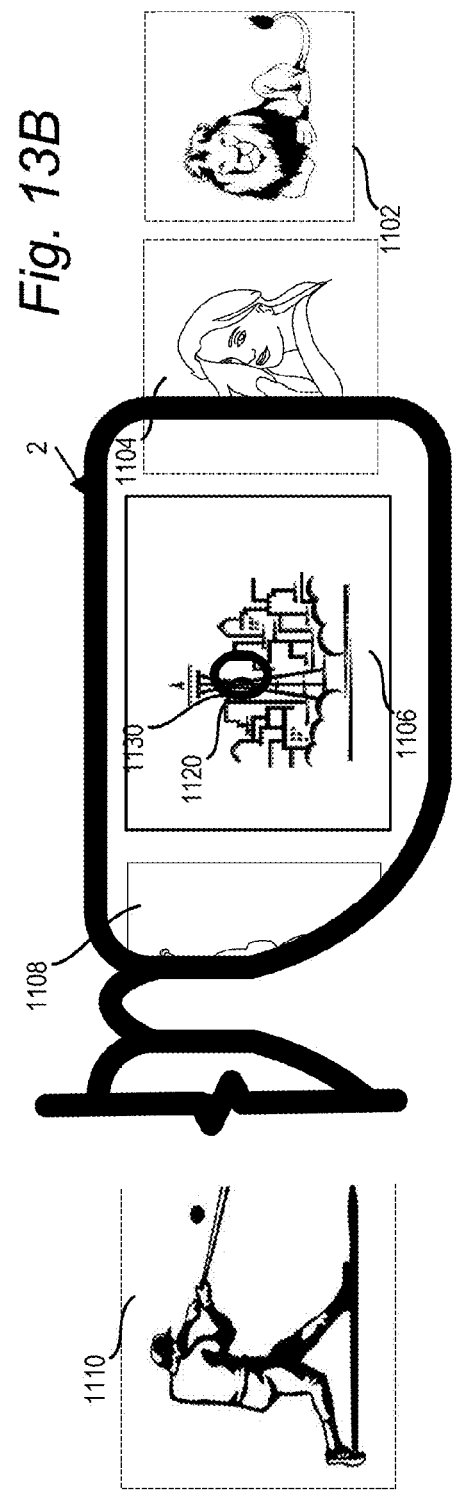

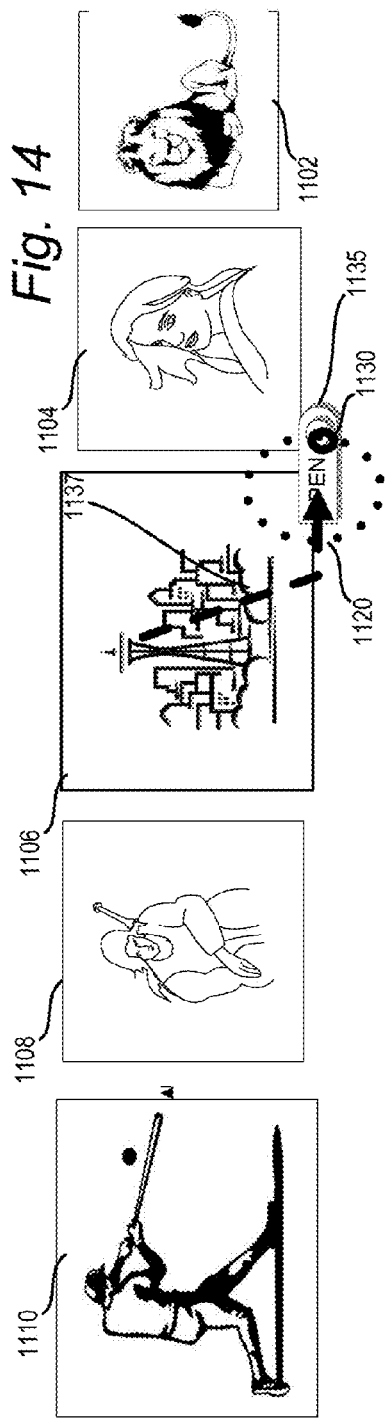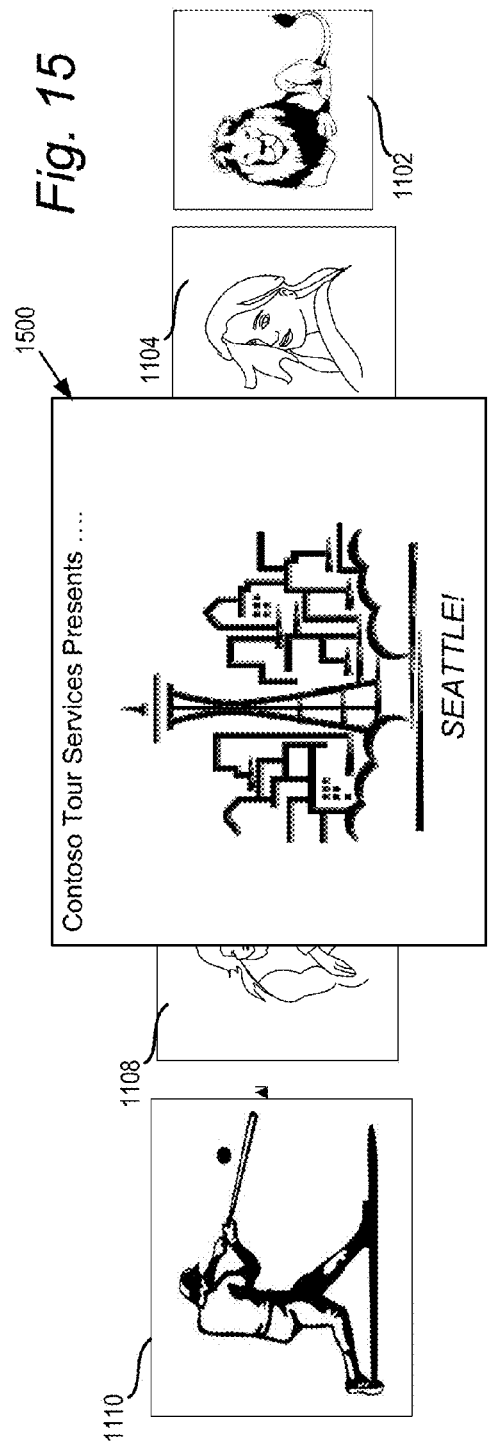

US 9,329,682 B2

MULTI-STEP VIRTUAL OBJECT SELECTION

BACKGROUND

Mixed reality is a technology that allows virtual objects to be mixed with a real world physical environment. A see-through, head mounted display (HMD) device may be worn by a user to view the mixed imagery of real objects and virtual objects displayed in the user's field of view.

A user may interact with virtual objects, for example by performing hand or voice gestures to move the objects, alter their appearance or simply view them. Interaction with virtual objects by performing hand or voice gestures may be somewhat tedious when continued over time. Natural user interfaces such as MICROSOFT KINECT® using the XBOX 360® allow users to select items by tracking movement of the user's appendage and positioning a rendered version of the appendage which relative to an object on an accompanying display. When the appendage is sufficiently close to the object, a visual indicator is displayed and a timer runs with a visual indicator providing feedback to the user that the object or item is being selected. An application can then act on the selection.

SUMMARY

Technology in a head mounted display allows user selection of a virtual object rendered in the display based on determining that the user has focused on an object. Multi-step focusing by the user on a selectable virtual object and a validation object are used to confirm a user's intent to select an object. Focus on the selectable object is determined and then a validation object is displayed. When user focus moves to the validation object, a timeout determines that a selection of the validation object, and thus the selectable object has occurred. The technology can be used in see through head mounted displays to allow a user to effectively navigate an environment with a multitude of virtual objects without unintended selections.

A see though head mounted display apparatus includes a see through head mounted display; and a processor coupled to the head mounted display. The processor is programmed to render at least one selectable virtual object in the head mounted display and determine the gaze and head position of a user. Determination a focus can be made based on a user's gaze, a user's head position, or both. A determination of an initial selection of the selectable virtual object based on the user focus is made and a validation object proximate to the selectable virtual object is displayed. Detection of a selection of the selectable object by the user is made when the focus of the user rests on the validation object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1B and 1C illustrate the view of a user through a head mounted display.

FIGS. 11A and 11B illustrate a top-down perspective of a user viewing a number of virtual objects and a user's perspective view of such virtual objects.

FIGS. 12A and 12B illustrate the views of FIGS. 11A and 11B of the virtual objects and a user's perspective view of such virtual objects as a user rotates user view and focus relative to the virtual objects.

FIGS. 13A and 13B illustrate the views of FIGS. 11A through 12B of the virtual objects and a user's perspective view of such virtual objects as a user focus comes to rest on one of the virtual objects.

FIG. 14 illustrates user eye focus and selection of one of the virtual objects in FIGS. 11A-13B.

FIG. 15 illustrates the effect of the selection in FIG. 14.

DETAILED DESCRIPTION

Figure 1A:
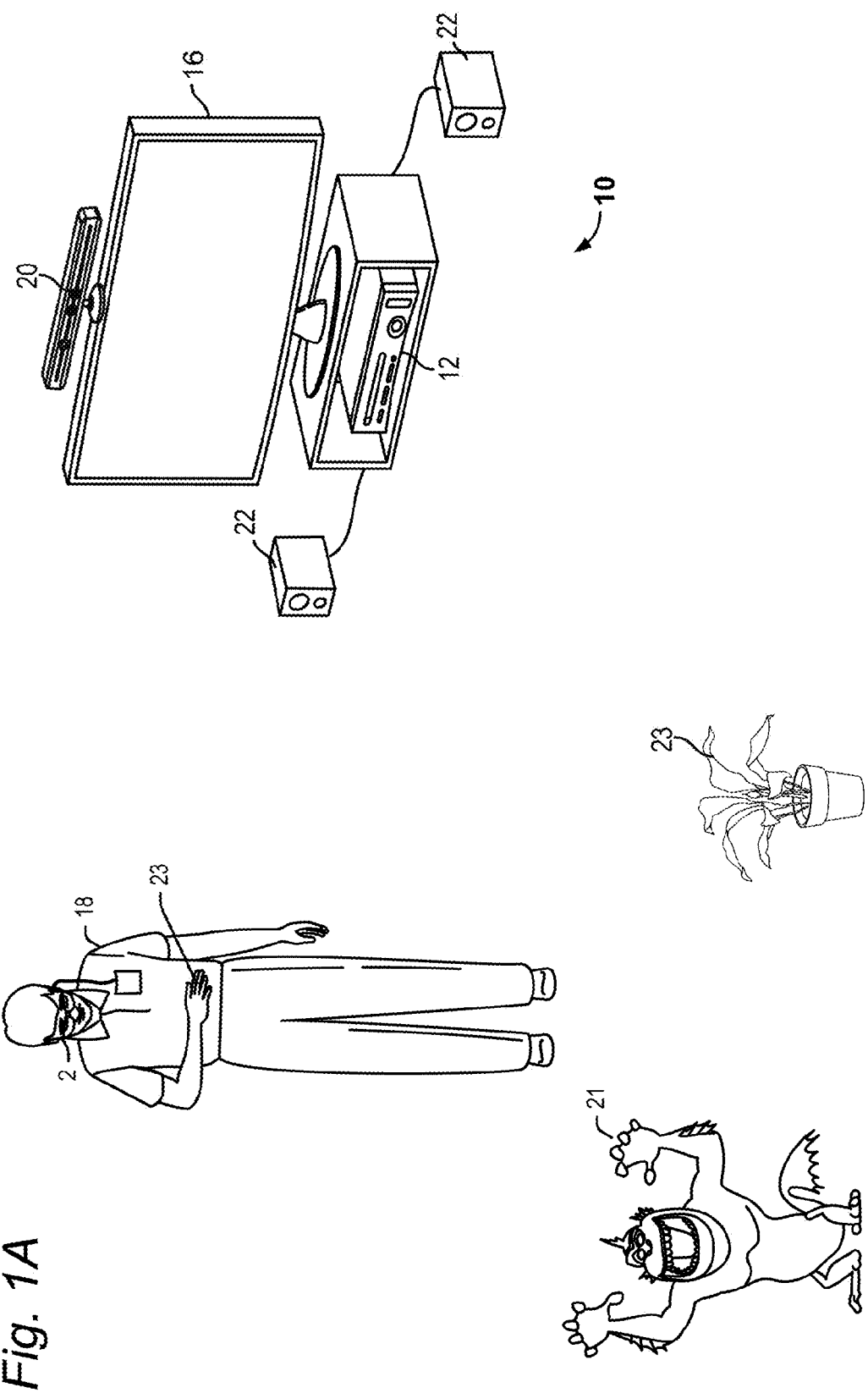
FIG. 1A is an illustration of example components of one embodiment of a system for presenting a mixed reality environment to one or more users.

Technology is presented which allows user selection of a virtual object based on determining that the user has focused on an object. The technology uses a multi-step focusing by the user on a selectable virtual object and a validation object to confirm a user's intent to select an object. A first timer runs after determining a user has focused on the selectable object before displaying the validation object. When user focus moves to the validation object, another timeout determines that a selection of the virtual object has occurred. Determination a focus can be made based on a user's gaze, a user's head position, or both. The technology can be used in see through head mounted displays to allow a user to effectively navigate an environment with a multitude of virtual objects without unintended selections.

A head mounted display device may include a display element. The display element is to a degree transparent so that a user can look through the display element at real world objects within the user's field of view (FOV). The display element also provides the ability to project virtual objects into the FOV of the user such that the virtual objects may also appear alongside the real world objects. The system automatically tracks where the user is looking so that the system can determine where to insert the virtual object in the FOV of the user. Once the system knows where to project the virtual object, the image is projected using the display element.

Virtual objects may include an object definition. The definition may include data allowing the display device 2 to render the virtual object in the field of view of a user. One component of the definition may comprise an object type, object size, and one or more optimal viewing perspectives and orientation. Each optimal viewing perspective may comprise a definition of an optimal perspective for a user view of the object. When a virtual object is shared, the technology presented herein uses the object definition and the locations and field of view of each user with whom the object is shared to determine an optimal location at which to render the object for each user.

In one alternative, the hub computing system and one or more of the processing units may cooperate to build a model of the environment including the x, y, z Cartesian positions of all users, real world objects and virtual three-dimensional objects in the room or other environment. The positions of each head mounted display device worn by the users in the environment may be calibrated to the model of the environment and to each other. This allows the system to determine each user's line of sight and FOV of the environment. Thus, a virtual object may be displayed to each user, but the display of the virtual object from each user's perspective may be relative, adjusting the virtual object for parallax and any occlusions from or by other objects in the environment. The model of the environment, referred to herein as a scene map, as well as all tracking of the user's FOV and objects in the environment may be generated by the hub and mobile processing unit working in tandem or individually.

Figure 2:
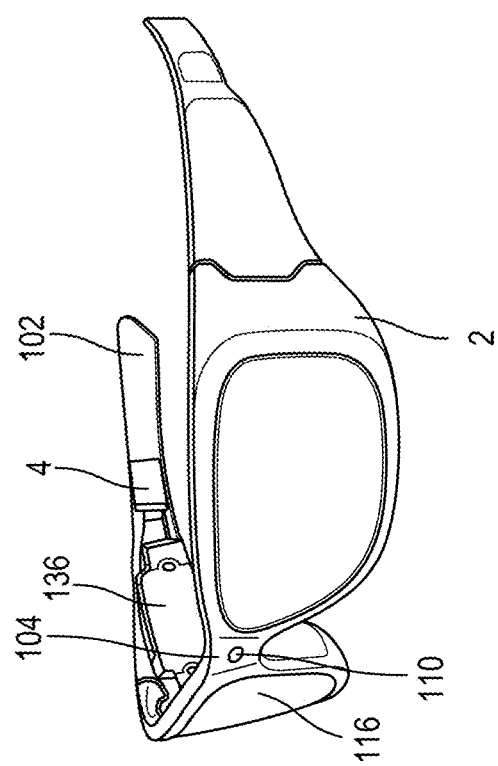
FIG. 2 is a perspective view of one embodiment of a head mounted display unit.
Figure 3:
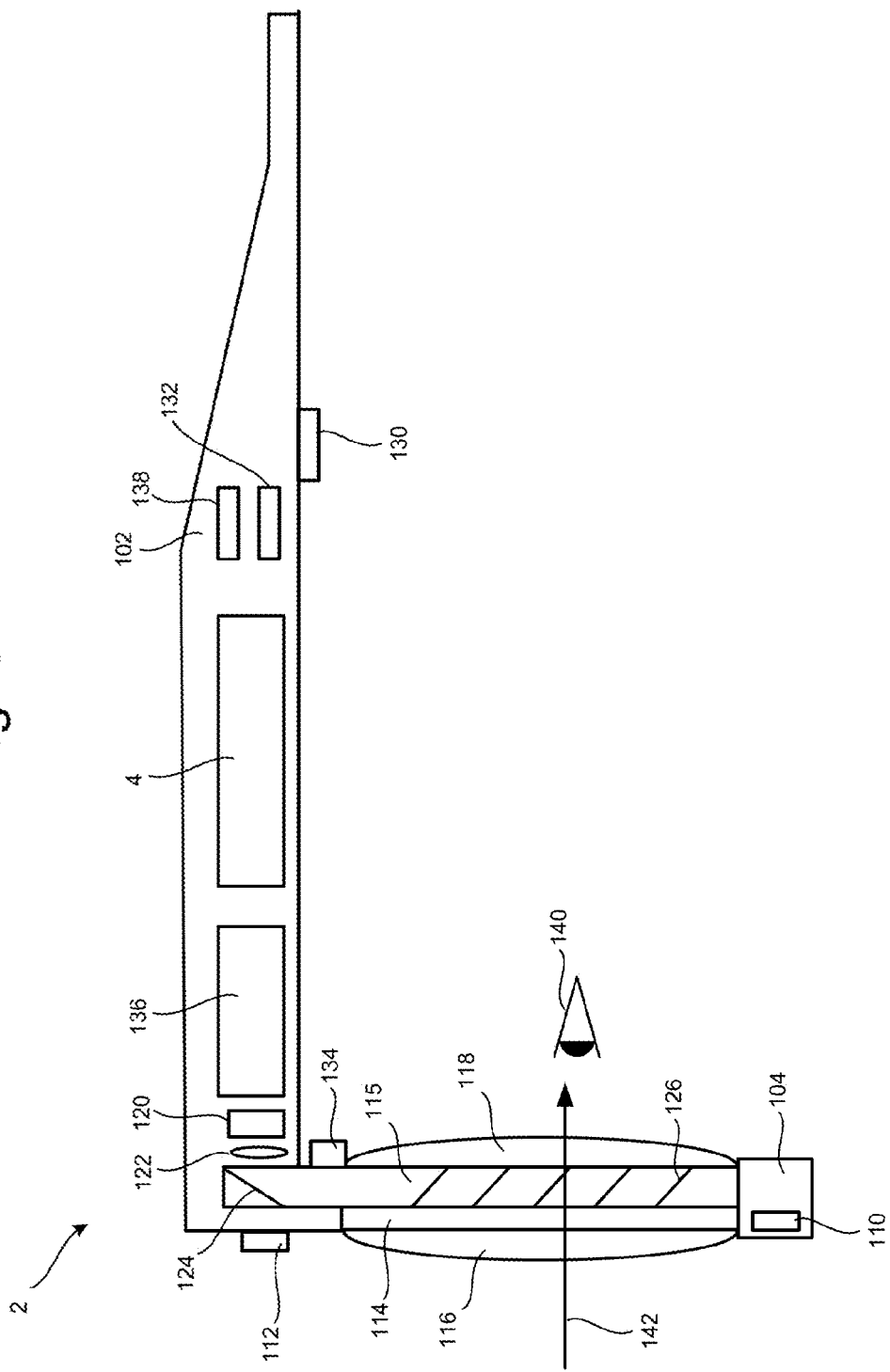
FIG. 3 is a side view of a portion of one embodiment of a head mounted display unit.

FIG. 1A illustrates a system 10 for providing a mixed reality experience by fusing virtual object 21 with real content within a user's FOV. FIG. 1A shows a single user 18 wearing a head mounted display device 2, but it is understood that more than one user may be present in the mixed reality environment and viewing the same virtual objects from their own perspective. As seen in FIGS. 2 and 3, a head mounted display device 2 may include an integrated processing unit 4. In other embodiments, the processing unit 4 may be separate from the head mounted display device 2, and may communicate with the head mounted display device 2 via wired or wireless communication.

Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be provided remotely from the processing unit 4, so that the hub computing system 12 and processing unit 4 communicate via a wireless network such as a LAN or WAN. In further embodiments, the hub computing system 12 may be omitted to provide a mobile mixed reality experience using the head mounted display devices 2 and processing units 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes a capture device 20 for capturing image data from portions of a scene within its FOV. As used herein, a scene is the environment in which the users move around, which environment is captured within the FOV of the capture device 20 and/or the FOV of each head mounted display device 2. FIG. 1A shows a single capture device 20, but there may be multiple capture devices in further embodiments which cooperate to collectively capture image data from a scene within the composite FOVs of the multiple capture devices 20. Capture device 20 may include one or more cameras that visually monitor the user 18 and the surrounding space such that gestures and/or movements performed by the user, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. In one example, audiovisual device 16 includes internal speakers. In other embodiments, audiovisual device 16 and hub computing system 12 may be connected to external speakers 22.

The hub computing system 12, together with the head mounted display device 2 and processing unit 4, may provide a mixed reality experience where one or more virtual objects, such as virtual object 21 in FIG. 1A, may be mixed together with real world objects in a scene. FIG. 1A illustrates examples of a plant real object 23 or a user's hand as real world objects appearing within the user's FOV.

In the illustration of FIG. 1A, the user 18 is shown with virtual object 21. FIGS. 1B and 1C illustrates object 21 from the perspective of the user 18 through the display 2. As discussed below with respect to FIGS. 11 through 14, the user's gaze and the user's head position are not always in alignment. Generally, when a user intends to direct a user's focus on a particular object, both the user's gaze and the user's head will be in close or near alignment. This is because generally humans tend to follow their gaze with the motion of their head.

Illustrated in FIG. 1B is the virtual object 21 shown in FIG. 1A. In this instance, both the user's head direction relative to the object 21 (represented by intersection point 21h) and the user's gaze direction (represented by intersection point 21g) are directed at the virtual object 221. Once a user has selected the object, and indicated to an application controlling the object 21 the user selection has occurred, the application may cause the object to perform some function. In the illustration in FIG. 1C, the virtual object monster 21 becomes animated. Any number of different functions can be performed on virtual objects in accordance with any number of different applications running in the see-through head mounted display device 2.

FIGS. 2 and 3 show perspective and side views of the head mounted display device 2. FIG. 3 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye. More details of opacity filter 114 and light-guide optical element 115 are provided in U.S. Published Patent Application No. 2012/0127284, entitled, "Head-Mounted Display Device Which Provides Surround Video," which application published on May 24, 2012.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual object from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user. More details of a light-guide optical element can be found in United States Patent Publication No. 2008/0285140, entitled "Substrate-Guided Optical Devices," published on Nov. 20, 2008.

Figure 4:
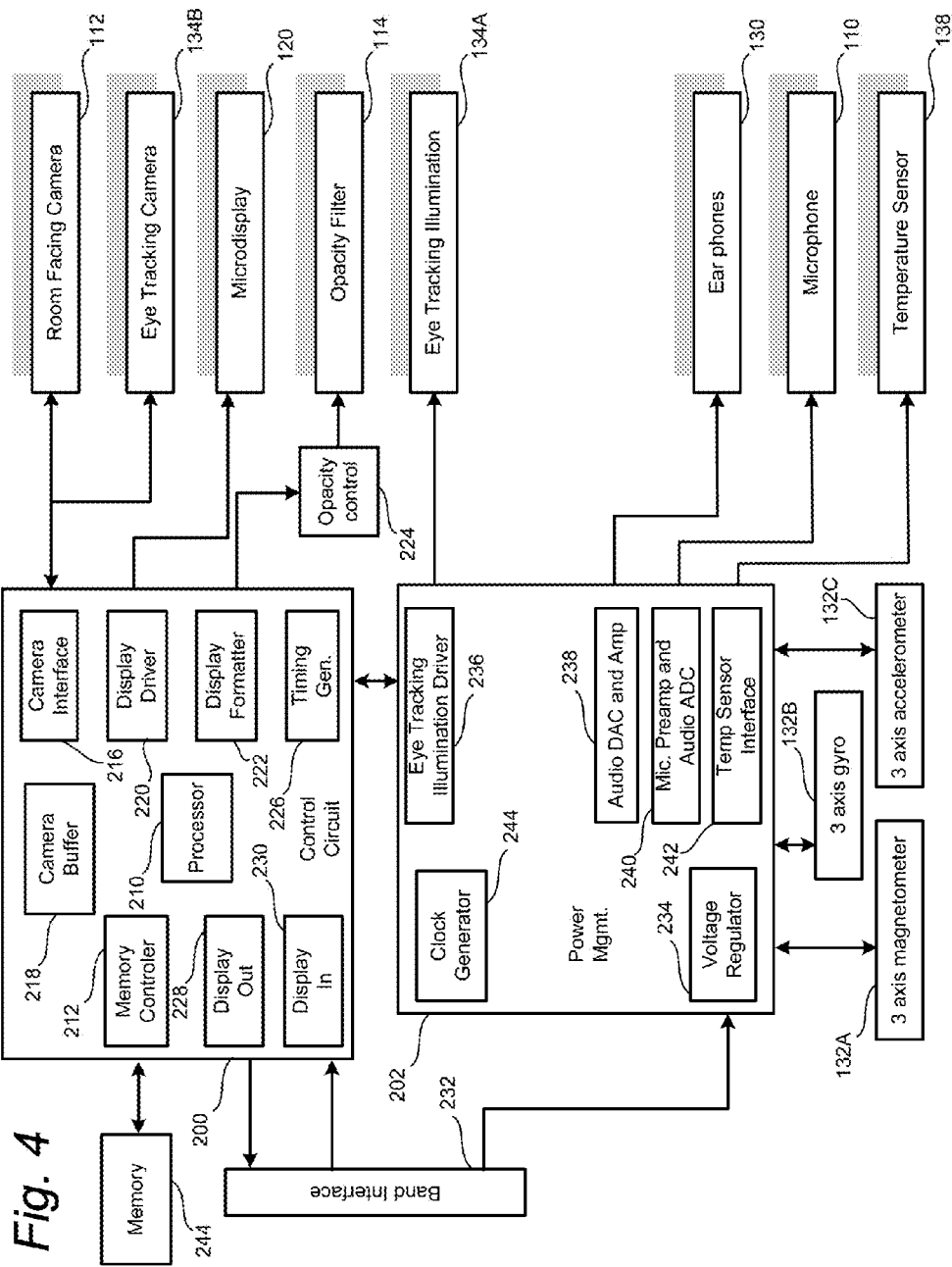
FIG. 4 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008, Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 5:
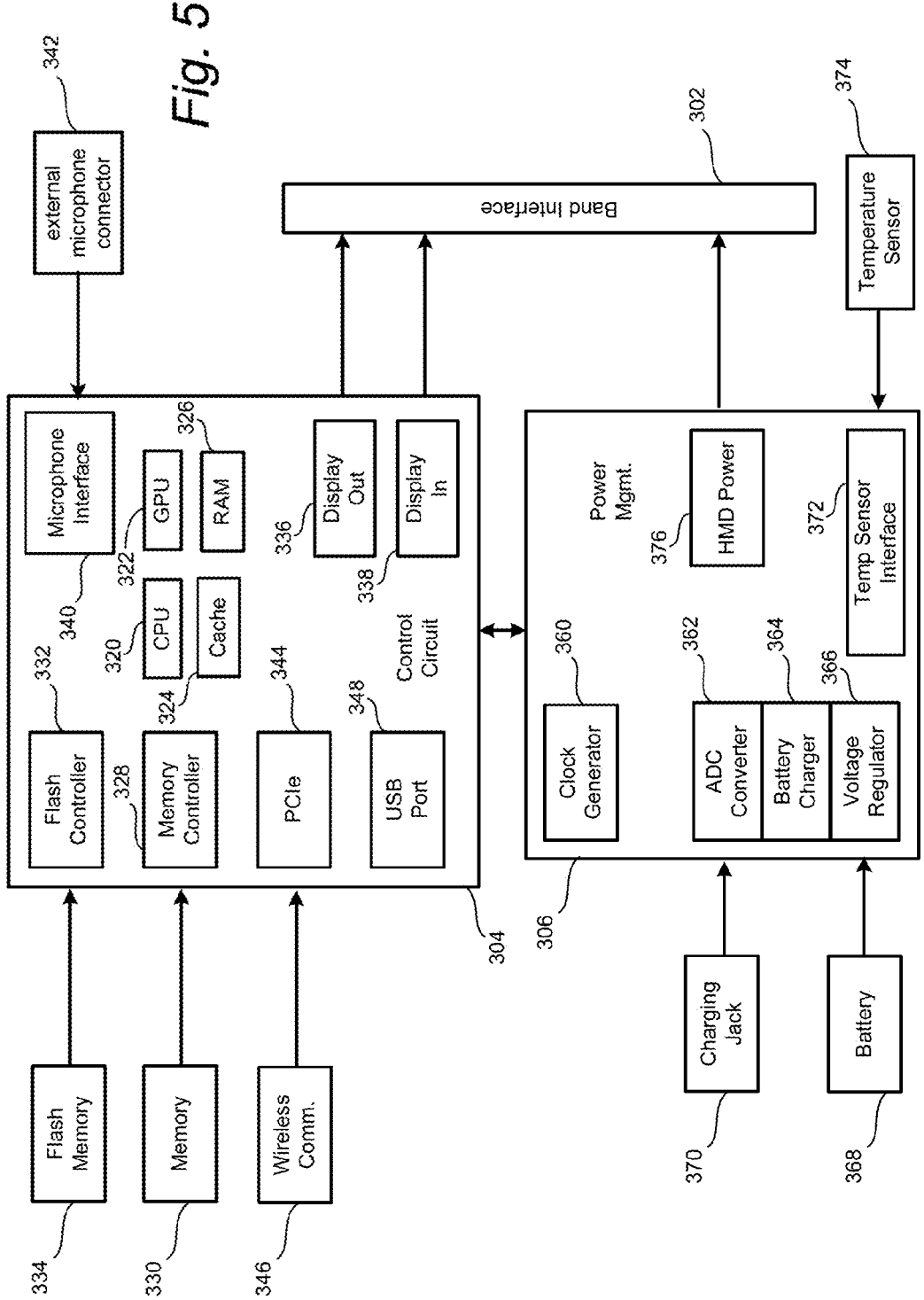
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual objects seamlessly with the user's view of the real world. Additionally, the head mounted display device components of FIG. 4 include many sensors that track various conditions. Head mounted display device 2 will receive instructions about the virtual object from processing unit 4 and will provide the sensor information back to processing unit 4. Processing unit 4, the components of which are depicted in FIG. 4, will receive the sensory information from head mounted display device 2 and will exchange information and data with the hub computing system 12 (FIG. 1A). Based on that exchange of information and data, processing unit 4 will determine where and when to provide a virtual object to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual object being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual object to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Blue-Tooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
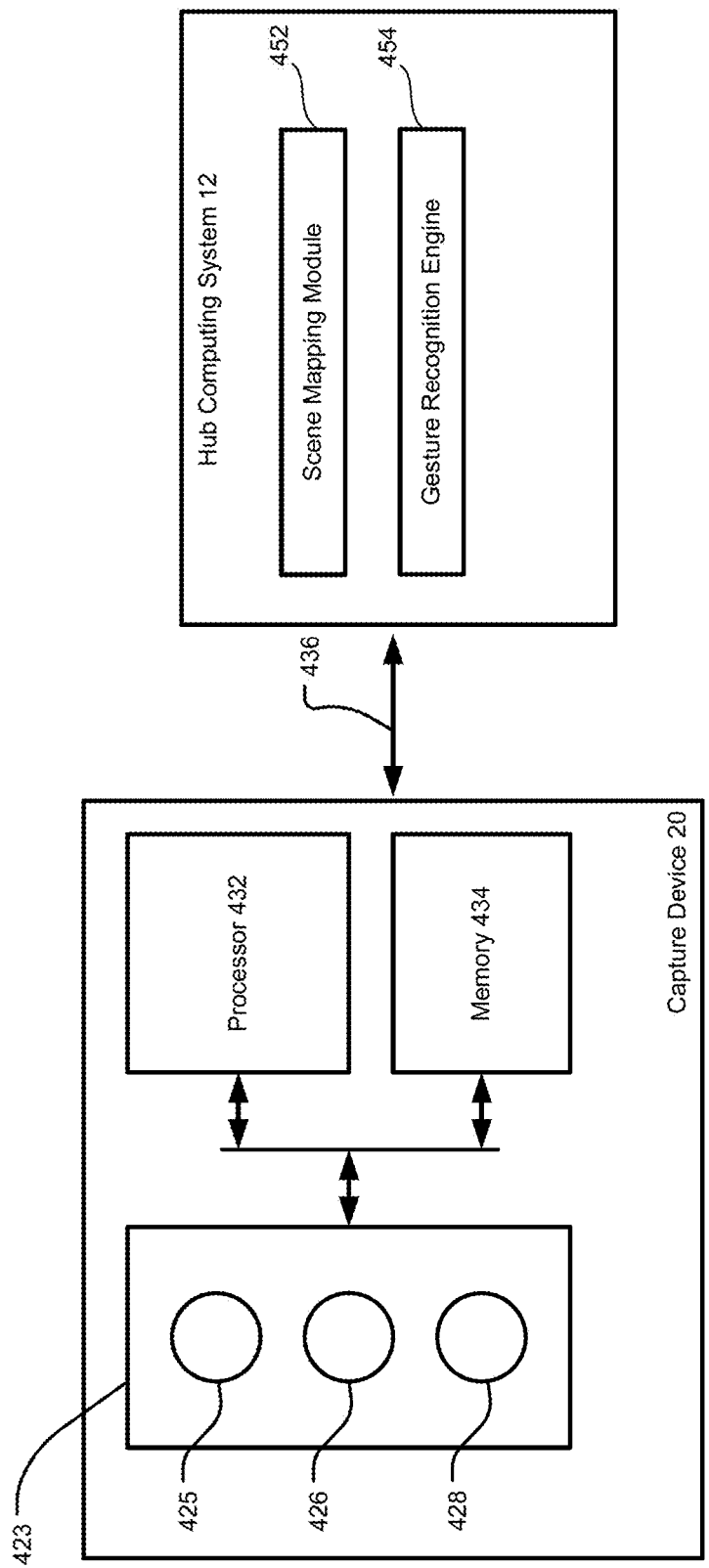
FIG. 6 is a block diagram of one embodiment of the components of a hub computing system used with head mounted display unit.

FIG. 6 illustrates an example embodiment of hub computing system 12 with a capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 6, capture device 20 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20 may emit an infrared light onto the scene and may then use sensors (in some embodiments, including sensors not shown) to detect the backscattered light from the surface of one or more targets and objects in the scene using, for example, the 3-D camera 426 and/or the RGB camera 428.

In an example embodiment, the capture device 20 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image camera component 423 and processor 432. According to another embodiment, the memory 434 may be integrated into processor 432 and/or the image camera component 423.

Capture device 20 is in communication with hub computing system 12 via a communication link 436. The communication link 436 may be a wired connection including, for example, a USB connection, a Firewire connection, an Ethernet cable connection, or the like and/or a wireless connection such as a wireless 802.11B, g, a, or n connection. According to one embodiment, hub computing system 12 may provide a clock to capture device 20 that may be used to determine when to capture, for example, a scene via the communication link 436. Additionally, the capture device 20 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

The above-described hub computing system 12, together with the head mounted display device 2 and processing unit 4, are able to insert a virtual three-dimensional object into the FOV of one or more users so that the virtual three-dimensional object augments and/or replaces the view of the real world. In one embodiment, head mounted display device 2, processing unit 4 and hub computing system 12 work together as each of the devices includes a subset of sensors that are used to obtain the data to determine where, when and how to insert the virtual three-dimensional object. In one embodiment, the calculations that determine where, when and how to insert a virtual three-dimensional object are performed by the hub computing system 12 and processing unit 4 working in tandem with each other. However, in further embodiments, all calculations may be performed by the hub computing system 12 working alone or the processing unit(s) 4 working alone. In other embodiments, at least some of the calculations can be performed by the head mounted display device 2.

In one example embodiment, hub computing system 12 and processing units 4 work together to create the scene map or model of the environment that the one or more users are in and track various moving objects in that environment. In addition, hub computing system 12 and/or processing unit 4 track the FOV of a head mounted display device 2 worn by a user 18 by tracking the position and orientation of the head mounted display device 2. Sensor information obtained by head mounted display device 2 is transmitted to processing unit 4. In one example, that information is transmitted to the hub computing system 12 which updates the scene model and transmits it back to the processing unit. The processing unit 4 then uses additional sensor information it receives from head mounted display device 2 to refine the FOV of the user and provide instructions to head mounted display device 2 on where, when and how to insert the virtual three-dimensional object. Based on sensor information from cameras in the capture device 20 and head mounted display device(s) 2, the scene model and the tracking information may be periodically updated between hub computing system 12 and processing unit 4 in a closed loop feedback system as explained below.

Figure 7:
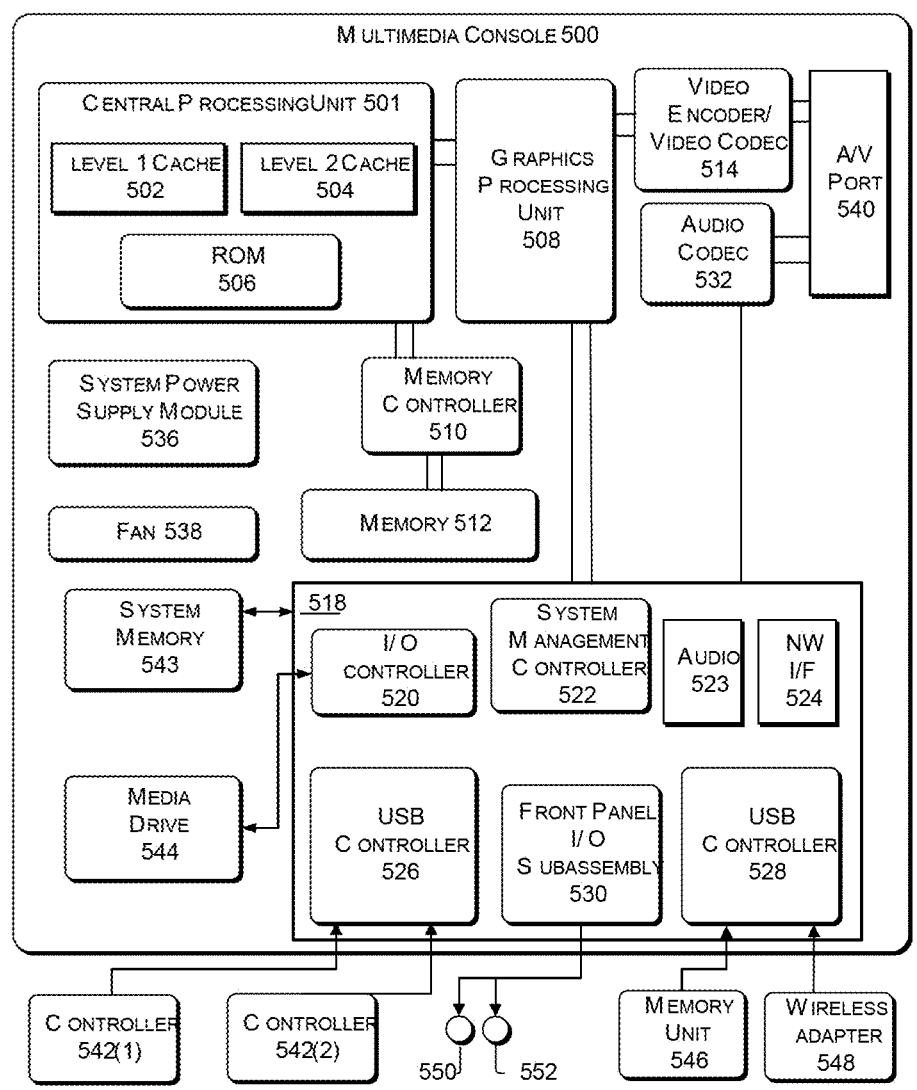
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

The head mounted display device 2 and processing unit 4 (collectively referred to at times as the mobile display device) shown in FIG. 1 are in communication with one hub computing system 12 (also referred to as the hub 12). There may be one or two or more mobile display devices in communication with the hub 12 in further embodiments. Each of the mobile display devices may communicate with the hub using wireless communication, as described above. In such an embodiment, it is contemplated that much of the information that is useful to the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs 12, with each hub including one or more mobile display devices. The hubs can communicate with each other directly or via the Internet (or other networks). Such an embodiment is disclosed in U.S. patent application Ser. No. 12/905,952 to Flaks et al., entitled "Fusing Virtual Content Into Real Content," filed Oct. 15, 2010.

Moreover, in further embodiments, the hub 12 may be omitted altogether. One benefit of such an embodiment is that the mixed reality experience of the present system becomes completely mobile, and may be used in both indoor and outdoor settings. In such an embodiment, all functions performed by the hub 12 in the description that follows may alternatively be performed by one of the processing units 4, some of the processing units 4 working in tandem, or all of the processing units 4 working in tandem. In such an embodiment, the respective mobile display devices 2 perform all functions of system 10, including generating and updating state data, a scene map, each user's view of the scene map, all texture and rendering information, video and audio data, and other information to perform the operations described herein. The embodiments described below with respect to the flowchart of FIG. 9 include a hub 12. However, in each such embodiment, one or more of the processing units 4 may alternatively perform all described functions of the hub 12.

Figure 8:
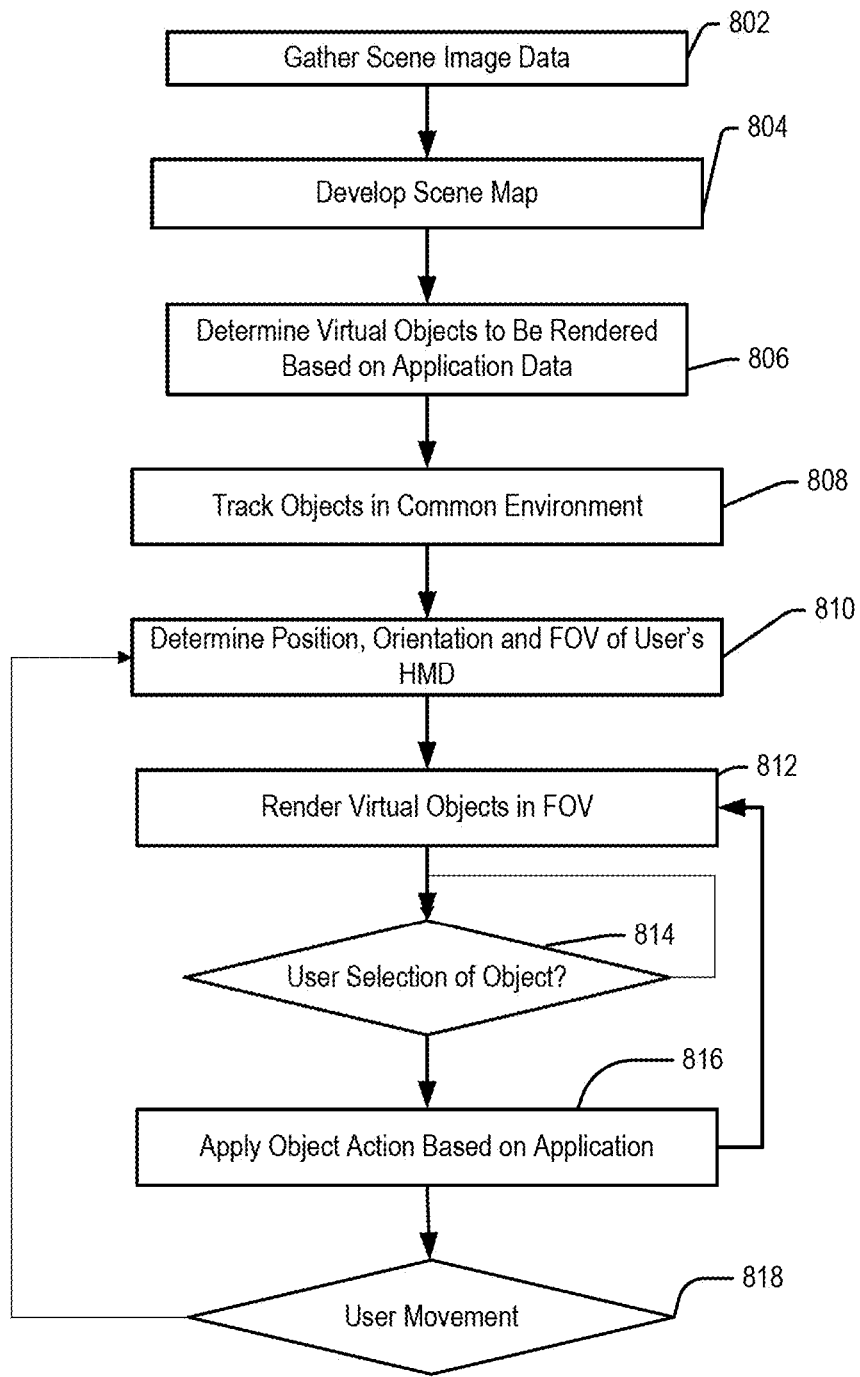
FIG. 8 is a flowchart representing a method in accordance with the present technology.

FIG. 8 is a flowchart illustrating a general method in accordance with the present technology. The method of FIG. 8 may be performed by components of the hub computing system 12, the processing unit 4 and/or head mounted display device 2 during a discrete time period such as the time it takes to generate, render and display a single frame of image data to each user. Any one or more of the hub computing system 12, the processing unit 4 and/or head mounted display device 2 acting alone or in conjunction with another of the systems may perform all or portions of the method.

In general, the system generates a scene map having x, y, z coordinates of the environment and objects in the environment such as users, real world objects and virtual objects. As noted above, a virtual object 21 may be virtually placed in the environment for example by an application running on the processing unit 4 and/or head mounted display device 2 or by user 18. The system also tracks the FOV of each user. While all users may be viewing the same aspects of the scene, they are viewing them from different perspectives.

With reference to FIG. 8, at step 802, scene data is gathered. For the hub 12, this may be image and audio data sensed by the depth camera 426 and RGB camera 428 of capture device 20. For the processing unit 4, this may be image data sensed by the head mounted display device 2, and in particular, by the cameras 112, the eye tracking assemblies 134 and the IMU 132. A combination of the capture device 20 and head mounted display data may be used.

At step 804, a scene map may be developed identifying the geometry of the scene as well as the geometry and positions of objects within the scene. In embodiments, the scene map generated in a given frame may include the x, y and z positions in the local coordinate system of all users, real world objects and virtual objects in the common environment. The scene map may be used in positioning virtual objects within the scene, as well as displaying virtual three-dimensional objects with the proper occlusion (a virtual three-dimensional object may be occluded, or a virtual three-dimensional object may occlude, a real world object or another virtual three-dimensional object). At 806, the positions of various real and virtual objects in a user environment are determined.

In step 808, the system may detect and track moving objects such as humans moving in the common environment, and update the scene map based on the positions of moving objects.

In step 810, a determination of position, the orientation and the FOV of a user's head mounted display device 2. Further details of step 810 are now described with respect to the flowchart of FIG. 9. As the position, orientation and FOV of other users is determined, this information may be retrieved to the device performing the method for use in determining the changes to viewing positions of virtual objects.

At 812, virtual objects are rendered in the field of view of a user wearing device 2. Each object may include an object definition used to render the object, including graphical information for the object as well as the position and orientation at which the object should be rendered.

At step 814, a determination is made as to whether a user has selected a virtual object rendered in step 812. At method for determining whether a user has selected a virtual object and illustrations of the selection are set forth with respect to FIGS. 11-14.

At step 816, if selection of an object has been determined at 814, a selection indicator may be transmitted to the processor 4, HUB 12 and/or an application to act on the selection of the object.

At step 818, if user movement relative to the environment is detected, the method updates the position, orientation and FOV at 810. User movement may comprise movement to manipulate the object, as discussed above, or movement within the common environment. A user may physically move within the common environment and their position music relative to the virtual object may change.

Figure 9:
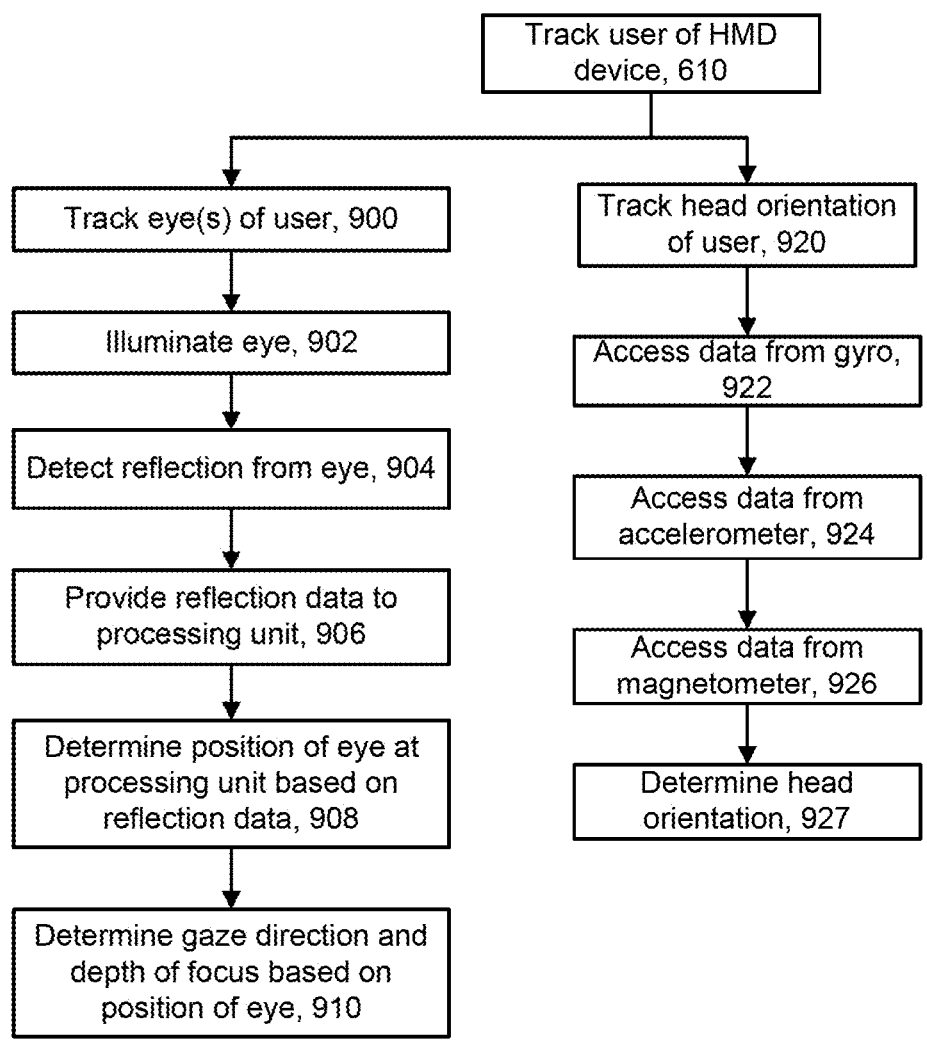
FIG. 9 is a depiction of the flowchart representing one method of implementing step 612 in FIG. 8.

FIG. 9 illustrates one method for performing step 810 in FIG. 8. In one approach, the tracking of a user can be classified into two different branches relating to eye tracking and, head orientation tracking.

Step 900 identifies a branch for tracking one or both eyes of a user using the technology described above. In step 902, the eye is illuminated, e.g., using infrared light from several LEDs of the eye tracking illumination 134 in FIG. 3. In step 904, the reflection from the eye is detected using one or more infrared eye tracking cameras 134B. In step 906, the reflection data is provided to the processing unit 4. In step 908, the processing unit 4 determines the position of the eye based on the reflection data, as discussed above. Step 910 determines a gaze direction (e.g., discussed further in connection with FIG. 11) and a focal distance.

In one approach, the location of the eyeball can be determined based on the positions of the cameras and LEDs. The center of the pupil can be found using image processing, and ray which extends through the center of the pupil can be determined as a visual axis. In particular, one possible eye tracking technique uses the location of a glint, which is a small amount of light that reflects off the pupil when the pupil is illuminated. A computer program estimates the location of the gaze based on the glint. Another possible eye tracking technique is the Pupil-Center/Corneal-Reflection Technique, which can be more accurate than the location of glint technique because it tracks both the glint and the center of the pupil. The center of the pupil is generally the precise location of sight, and by tracking this area within the parameters of the glint, it is possible to make an accurate prediction of where the eyes are gazing.

In another approach, the shape of the pupil can be used to determine the direction in which the user is gazing. The pupil becomes more elliptical in proportion to the angle of viewing relative to the straight ahead direction.

In another approach, multiple glints in an eye are detected to find the 3$d$ location of the eye, estimate the radius of the eye, and then draw a line through the center of the eye through the pupil center to get a gaze direction. For example, see Hennessey et al. "A Single Camera Eye-Gaze Tracking System with Free Head Motion," ETRA 2006, San Diego, CA, ACM p. 88, pp. 87-94.

Step 920 identifies a branch for tracking a head orientation of the user using the technology described above. At step 922, the processing unit 4 accesses data from three axis gyro 132B. In step 924, the processing unit 4 accesses data from three axis accelerometer 132C. In step 926, the processing unit 4 accesses data from three axis magnetometer 132A. Based on these inputs, the processing unit 4 can determine a head orientation, at step 927. In another approach, the processing unit 4 refines orientation data which is received from the hub computing device 12 with the data from the gyro, accelerometer and magnetometer.

Figure 10:
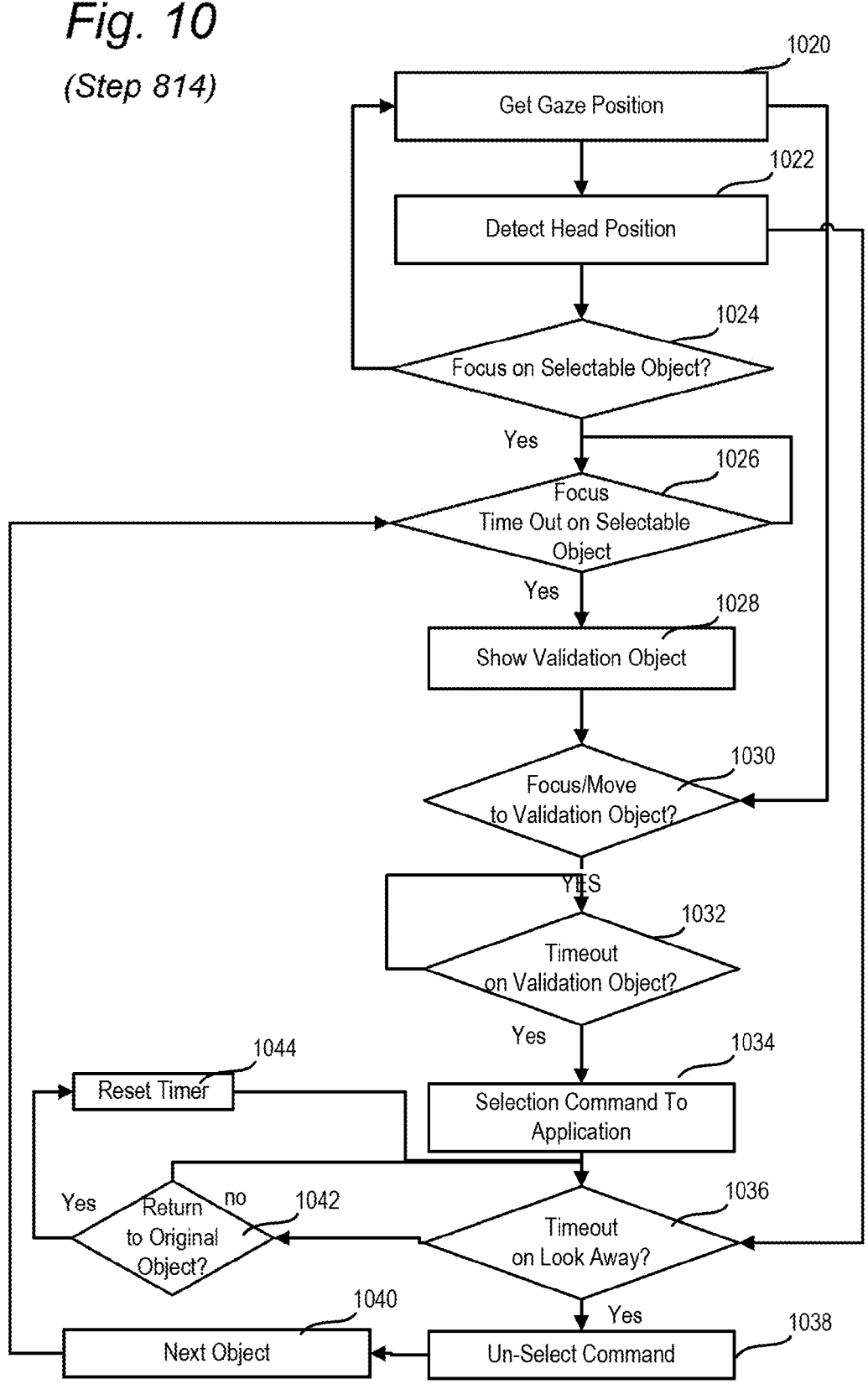
FIG. 10 is a depiction of a flowchart representing one method of implementing step 616 in FIG. 8.

FIG. 10 is a flowchart illustrating one method for determining a selection of a virtual object in accordance with the present technology. FIG. 10 can be understood relative to FIGS. 11A through 14.

At steps 1020 and 1022, the user's gaze position and head position are retrieved. The user's gaze position and head position are determined as discussed above with respect to FIG. 9. As illustrated below with respect to FIGS. 11A-13B, a user's gaze and head positions may not always be aligned.

At step 1024, an initial determination is made as to whether not the user is focusing on a selectable object. As a user scans both the real and virtual objects in the field of view head mounted display 2, the user may gaze upon both real and virtual objects which are not selectable. A selectable object is one that may be manipulated by the user based on the selection, or whose selection results in a function being performed with respect to the object. For example, upon selection of the monster in FIG. 1B, the monster virtual object becomes animated as in FIG. 1C. The determination at step 1024 is an indication of whether the user has begun to focus on a selectable object.

Focus on a selectable object can be determined in accordance with the description below with respect to FIGS. 11 through 14. The determination a focus can be made based on a user's gaze, a user's head position, or both. If the gaze rests on the object for a predetermined period of time, the user will be determined to have focused on the object. In an alternative embodiment, if the user's gaze and head position are aligned to within some degree with respect to the selectable object, then the user will be determined to a focus on the object.

Once the initial focus on the object is determined at 1024, the user's gaze on a selectable object will initiate a relatively short timer at step 1026. If the user remains focused on the object for the duration of the timer at 1026, a validation object will be displayed at 1028. The length of the timer at 1026 may be on the order of one-half of one second.

A validation object is illustrated in FIG. 14. Once the validation object is displayed, a user's focus on the validation object will determine whether the selectable virtual object is active. The validation object is rendered to appear connected to the selectable virtual object with no other selectable virtual object therein between. Various shapes and appearances of the selection and validation object can be used.

At step 1030, a determination is made as to whether not the user changes focus to the validation object. Again, focus on a validation object can be determined based on the user's gaze, the user's head position, or both. In addition or alternatively, a pattern formed by the user's gaze path may contribute to the determination of focus on the validation object at 1028.

If the user is determined to be focused on the validation object at 1039, a timeout on the validation object runs at step 1032. The timeout ensures that the user intends to select the original selectable object by focusing on the validation object. If the validation object timer finishes with the user focused on the validation object, a selection command is directed to the processor 4 and/or an application at 1034. The timer for the timeout on the validation object may be greater than, the same as or shorter than the time period of step 1026. In one embodiment, the time period for step 1032 is longer than that for step 1026.

At this point, the device processor 4 and/or application will manipulate the selected object in a manner which is directed by the developer of the application.

At some point subsequent to the selection command being issued, the user will likely look away from the selectable object. Once the user's focus is removed from the selectable object, a look away timer user is run at 1036. When the timer expires, and unselect command is issued and 1038. If the user looks back to the selectable object at 1042 prior to the expiration of the timer, the timer resets at 1044 until the user looks away again at 1036. The method proceeds to the next selected object and 1040.

FIGS. 11A-13A illustrate a top-down perspective, and FIGS. 11B-13 illustrate a user perspective, of a user viewing a number of virtual objects. In FIGS. 11A and 11B, a user 18 wearing a see through head mounted display device 2 may a number of virtual objects 1102, 1104, 1106, 1108, and 1110. In some embodiments, virtual objects may be selectable virtual objects and non-selectable virtual objects. Non-selectable virtual objects may be rendered to a viewer but may not be selected by the user to provide additional functions. Selectable virtual objects provide some additional functionality.

FIG. 11A, the user's gaze is illustrated by a vector 1030, while the user is relative head position is illustrated by a vector 1120. FIG. 11B illustrates the view of the user 18 as seen through the head mounted display 2. Only one lens of head mounted display 2 is illustrated. As shown in FIG. 11B, objects 1102 and 1104 will be fully rendered, while objects 1106, 1108, 1110 are illustrated in phantom to show the respective positions, but it should be understood that objects 1106, 1108, 1110 would not be visible to the user unless they were in the user's the field of view when wearing display 2.

FIG. 11B also illustrates the intersection points of the gaze vector 1130 and the head direction vector 1130. Such intersections would not be visible to the user 18 and are shown in different sizes in FIG. 11B for illustration purposes only.

In FIG. 11A, the user's head is rotating counterclockwise. As such, it is likely that the user's gaze will precede the user's head motion and hence the user's gaze as represented by vector 1030 will lead the user's head position. As shown in FIG. 11B, a measurable difference 1132 exists between the focus vector 1130 and the head position vector 1120.

FIG. 12A illustrates a rotated position of the user gaze and head position along a gaze path 1127 showing that the user's gaze vector 1130 advances before the users had position vector 1120. As the user moves along the rotational path 1125, object 1106 will come into focus and object 1102 will leave the view.

FIGS. 13A and 13D illustrate the user's gaze and head position coming to rest on an object 1106. In this instance, there is little or no distance between the head vector 1120 and gaze vector 1130. FIG. 13B illustrates that both the users gaze and head position are aligned on the object 1106. Where little or no difference between the intersection of the gaze vector 1130 and the head vector 1120 exist, the user can be determined to be focused on the object 1106. It should be understood that some difference between the intersection points of the respective vectors may be allowed and the level of difference determined according design objectives. In alternative embodiments, the intersection of the gaze vector 1130 on one object, and the user's head vector 1120 intersecting a wholly different virtual object, would still result in a determination that the user was focused on a particular object.

In yet another embodiment, only the intersection of the gaze vector 1030 with the selection object (and/or the validation object) is used.

FIG. 14 illustrates all virtual objects 1102 through 1110. In FIG. 14, a validation object 1135 is illustrated. Though the validation object takes a general form of a rectangle as shown in FIG. 14, the validation object may be any shape or size. Generally, the validation object is rendered in an un-obtrusive location with respect to the selection object, and proximate to the selection object. In addition, while the validation object is positioned below and to the right of the selection object, the validation object may be positioned in other locations relative to the selection object.

The validation object may or may not draw the user's focus to the validation object along a path 1145. If a user does not move to the validation object (as discussed at step 1130), the user may look away or remain focused on the selection object.

Once the user focuses on the validation object (as in step 1030 above), the user's continued gaze on the validation object 1135 will result in a determination that the user intends to select the validation object and in addition the selection object (completing the timer in step 1032 as discussed above.

In general, the gaze path of the user may follow path 1137 in FIG. 14. Minor deviations from the path 1137 may also occur (such as a more exaggerated angle in the path or a strict diagonal between the gaze intersection of FIG. 13B and the intersection of FIG. 14. In one embodiment, the user's movement on the relative path between the user's initial focus position shown in FIG. 13 B and user's new focus position shown in FIG. 14 can be used to verify a determination of the user's focus on validation object.

FIG. 15 illustrates the result of selection in one embodiment of the present technology.

In the example of FIG. 15, selection of object 1106—which is a picture of the Seattle skyline will open a virtual object 1500 travel services presentation.

Any one or more of the methods herein may be implemented by computer readable code stored on a computer storage medium which may be suitably read by any one or more of hub computing system 12, the processing unit 4 and/or head mounted display device 2.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim.

What is claimed is:

1. A method for activating a virtual object rendered by a see-through display, the method comprising:
   first rendering onto the see-through display one or more virtual objects, one of the first rendered virtual objects being a selectable virtual object that is selectable by the user to perform a corresponding automated action associated with the one selectable virtual object, where a fully actionable selection of the selectable virtual object automatically initiates the automated action corresponding to the selectable virtual object;
   after said first rendering, repeatedly determining gaze, head position and field of view of the user, the gaze, head position and field of view determining a corresponding user focus;
   if a determined corresponding focus of the user intersects with the first rendered and selectable virtual object, designating that intersection as an initial but not yet fully actionable selection of the focused-upon selectable virtual object;
   in response to said designation of an initial selecting of the focused-upon selectable virtual object, performing a second rendering onto the see-through display so as to additionally display a validation object proximate to the initially selected virtual object; and
   after said second rendering, further detecting whether the focus of the user intersects with the validation object and in response to the further detecting of such intersecting focus upon the validation object, switching the designation of the initial but not yet actionable selection to that of a fully actionable selection and thereby automatically initiating the corresponding automated action associated with the fully actionable selection of the selectable virtual object.

2. The method of claim 1 wherein the method further includes, prior to displaying the validation object, determining if the intersecting user focus remains on the first rendered and selectable virtual object for a predetermined first time period.

3. The method of claim 2 wherein said further detecting of the intersecting focus upon the validation object includes determining if the intersecting user focus remains on the additionally displayed validation object for a predetermined second time period.

4. The method of claim 1 and further including:
   after said designation of an initial selecting of the focused-upon selectable virtual object, determining if the intersection of the user focus leaves the initially selected selectable virtual object before said second rendering of the validation object and in response to a determined leaving of intersection, initiating an unselection of the initially selected virtual object.

5. The method of claim 4 wherein the determining if the intersection of the user focus leaves includes determining whether the gaze of the user next intersects with another one of the selectable virtual objects or with the rendered validation object.

6. The method of claim 4 wherein the determining of if the intersection of the user focus leaves includes determining whether a change in at least one of the gaze and the head direction of the user causes the user focus to next intersect with another one of the selectable virtual objects or with the rendered validation object in accordance with a defined difference amount, the difference amount being a function of the gaze and of the head direction of the user.

7. The method of claim 1 wherein detecting whether the user focus intersects the validation object includes determining a change of focus motion pattern performed by the user in changing focus between the selectable object and the validation object.

8. The method of claim 7 wherein the determining of the change of focus motion pattern performed by the user includes determining an angle of gaze shift.

9. The method of claim 1 wherein the method further includes, prior to displaying the validation object, determining if the user focus remains on the selectable virtual object for a first time period, and
   determining if the user focus remains on the validation object for a second time period, wherein the first time period is shorter than the second time period.

10. A see-through display apparatus, the apparatus comprising:
    a see-through display; and
    a processor coupled to the display, the processor being programmed to:
    render a selectable virtual object on the display;
    determine a user gaze and head position, of the user, thereby identifying a user focus of the user;
    determine an initial but not yet fully actionable selection of the selectable virtual object based on the user focus;
    after the determined initial but not yet fully actionable selection, adding to the display, a rendering of a validation object proximate to the initially but not yet fully actionably selected selectable virtual object; and
    determine a fully actionable selection of the initially selected selectable object by the user when the focus of the user rests on the validation object and responsive to the determining of the fully actionable selection, automatically initiating a predetermined automated action associated with the fully actionable selection of the selectable virtual object.

11. The apparatus of claim 10 wherein the processor is programmed to determine if the user focus remains on the selectable virtual object for a predetermined first time period.

12. The apparatus of claim 11 wherein the processor is programmed to detect whether the focus if the user focus remains on the validation object for a predetermined second time period.

13. The apparatus of claim 12 wherein the first time period is shorter than the second time period.

14. The apparatus of claim 13 wherein the processor is programmed to determine the user focus of the user by determining whether a user gaze intersects one of the selectable virtual object or the validation object.

15. The apparatus of claim 14 wherein the processor is programmed to determine whether the focus of the user leaves the selectable virtual object and initiating an unselection of the object.

16. The apparatus of claim 10 wherein the processor is programmed to issue a selection indicator responsive to detecting a selection of the selectable object.

17. A computer hardware storage medium storing operatively readable and executable code instructing a pre-specified processing device to render one or more virtual objects on a see-through display, the stored operatively readable and executable code comprising:
    code causing a rendering of one selectable virtual object, a selectable virtual object being initially selectable and thereafter more fully selectable by a user to engage by way of full selection, a predetermined function of the initially and then more fully selectable virtual object;

code causing a determining of a user gaze, head position and field of view for a user to establish a focus of the user;

code causing a determining of whether a user gaze and a user head direction intersect the selectable virtual object in accordance with a defined difference amount;

code causing a determining of whether the user gaze and user head direction intersect said selectable virtual object, and then causing an initiating of a first timer;

code causing, after expiration of the first timer, an indication that the selectable virtual object has been initially but not yet fully selected and causing an addition onto the see-through display of a validation object proximate to the selectable virtual object; and code causing, after the addition of the validation object, a detecting of whether the user gaze and user head direction intersect the validation object for a predetermined duration of a second timer thereby validating a full selection of the selectable object and causing automated engagement of the predetermined function of the selectable object.

18. The computer storage medium of claim 17 further including code detecting whether a gaze motion pattern between the selectable object and the validation object matches a known pattern.

19. The computer storage medium of claim 17 wherein code displaying the validation object renders the validation object to appear connected to the selectable virtual object with no other selectable virtual object therein between.

20. The computer storage medium of claim 17 further including code determining whether the gaze and head position of the user leaves the selectable virtual object and initiating an unselection of the object.

* * * * *